US006881331B1

(12) United States Patent
Barnes

(10) Patent No.: US 6,881,331 B1
(45) Date of Patent: Apr. 19, 2005

(54) ASSEMBLY FOR PURIFYING WATER

(76) Inventor: Ronald L. Barnes, #74 Revere Way, Huntsville, AL (US) 35801

(*) Notice: Subject to any disclaimer, the term of this patent is extended or adjusted under 35 U.S.C. 154(b) by 0 days.

(21) Appl. No.: 10/636,071

(22) Filed: Aug. 7, 2003

Related U.S. Application Data

(63) Continuation of application No. 09/794,601, filed on Feb. 27, 2001, now abandoned, which is a continuation-in-part of application No. 09/752,982, filed on Dec. 31, 2000, now Pat. No. 6,623,635, and a continuation-in-part of application No. 09/393,437, filed on Sep. 10, 1999, now Pat. No. 6,192,911.

(51) Int. Cl.[7] ............................................. C02F 1/32
(52) U.S. Cl. ..................... 210/192; 210/205; 210/218; 422/186.3; 250/437; 250/438
(58) Field of Search .................. 422/24, 186.3, 422/186.07; 261/DIG. 42; 250/436, 437, 438; 210/748, 764, 760, 192, 205, 218, 206, 208

(56) References Cited

U.S. PATENT DOCUMENTS 5,068,040 A * 11/1991 Jackson ................... 210/748
5,578,205 A * 11/1996 Martin .................... 210/199

FOREIGN PATENT DOCUMENTS

| EP | 269941 A1 | * | 6/1988 | ............. A23L/3/28 |
| EP | 701972 A1 | * | 3/1996 | ............. C02F/1/32 |
| JP | 58114714 A | * | 7/1983 | ............. B01D/53/34 |
| JP | 62201688 A | * | 9/1987 | ............. C02F/1/32 |
| JP | 04247294 A | * | 9/1992 | ............. C02F/1/78 |
| JP | 10174983 A | * | 6/1998 | ............. C02F/1/72 |
| SU | 1798317 A1 | * | 2/1993 | ............. C02F/1/32 |

* cited by examiner

Primary Examiner—Terry K. Cecil
(74) Attorney, Agent, or Firm—Mark Clodfelter

(57) ABSTRACT

An ozone-based water purification system is disclosed. In this system, a mixing venturi injects ozone and a liquid sanitizer into a stream of water to be treated. Following ozone and sanitizer injection, the stream of water is passed to a contact region where the ozone and sanitizer are allowed to react with contaminants and biota. The stream is then mixed by several mixing devices to allow residual ozone and sanitizer to further react with contaminants and biota. Particularly a counterflow system is employed wherein the stream is directed downward at several points so that bubbles containing ozone are forced to flow upward against the flow, lengthening ozone contact time. Also, the ultraviolet lamp used to generate ozone is mounted so that ultraviolet light therefrom is exposed to the flow water, providing additional sterilizing effects. In addition, a novel mixing venturi is disclosed that mixes a gas containing ozone and a liquid sanitizer into a motive flow of water.

15 Claims, 3 Drawing Sheets

Fig. 1

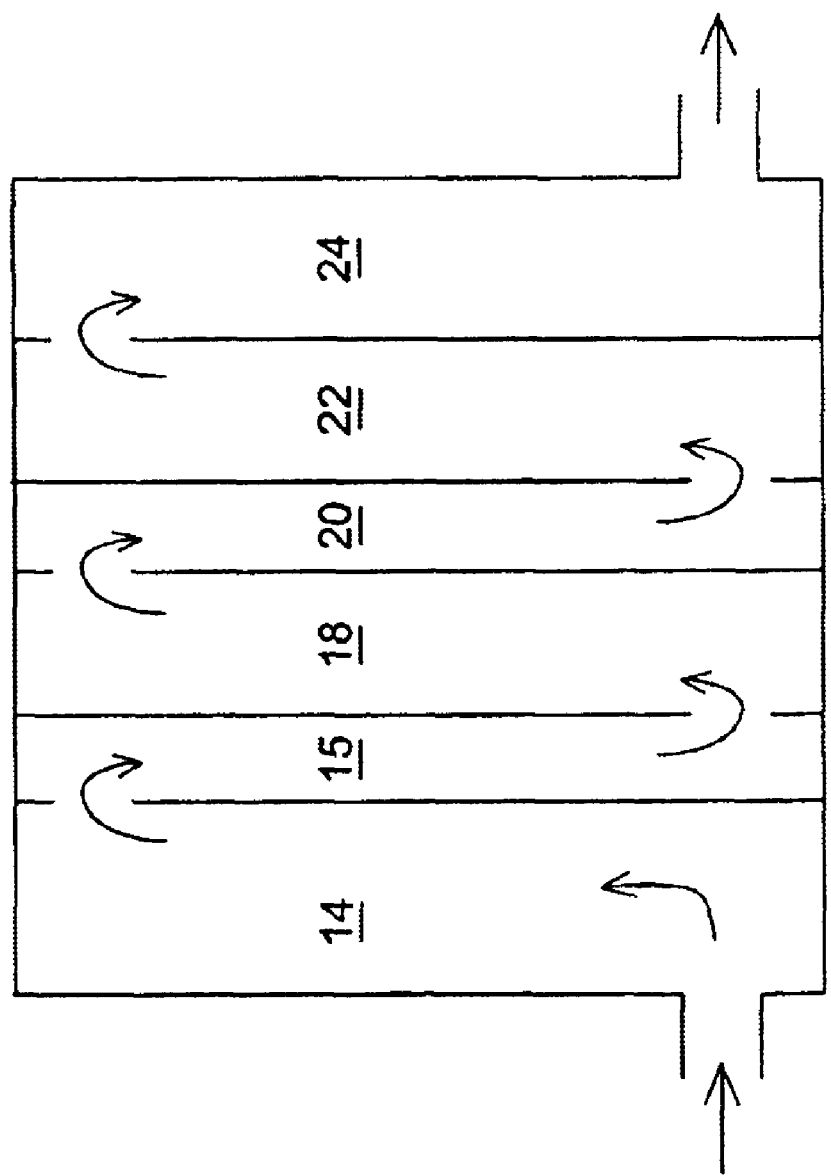

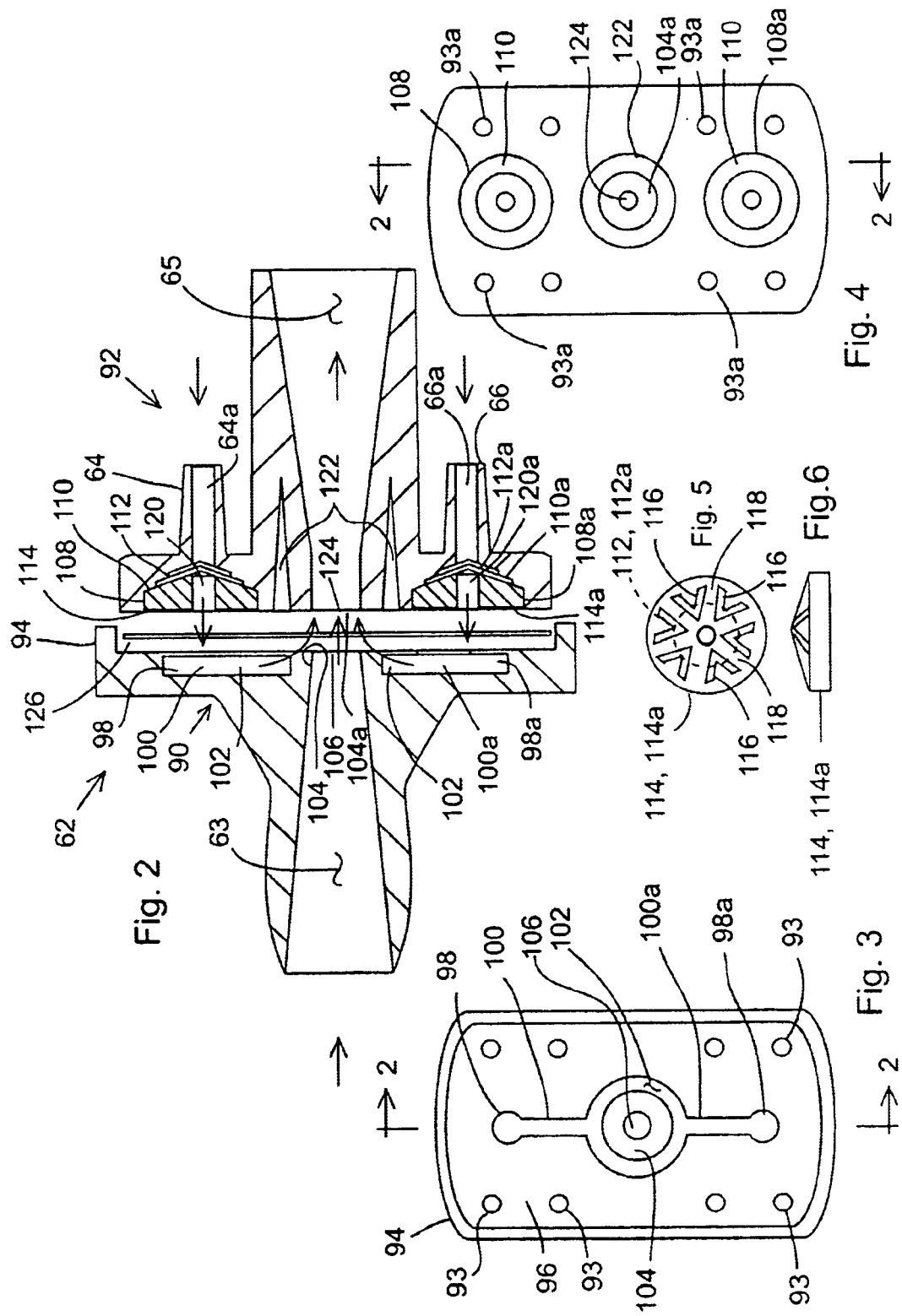

ASSEMBLY FOR PURIFYING WATER

CROSS REFERENCE TO RELATED APPLICATIONS

This application is a continuation of Applicant's U.S. patent application Ser. No. 09/794,601, filed Feb. 2, 2001, now abandoned which is a continuation-in-part of Applicant's U.S. patent application Ser. No. 09/752,982, filed Dec. 31, 2000, now U.S. Pat. No. 6,623,635 and Applicant's U.S. patent application Ser. No. 09/393,437, filed Sep. 10, 1999, and which issued on Feb. 27, 2001 as U.S. Pat. No. 6,192,911.

FIELD OF THE INVENTION

This invention relates to ozone-based water purification systems. More particularly, this invention relates to water purification systems utilizing a counterflow system in conjunction with a mixing venturi in order to allow premixing of compounds prior to introducing the mixed compounds in a flow of water for a spa, hot tub, swimming pool or the like.

BACKGROUND AND SUMMARY OP THE INVENTION

Commonly known ozone water purification systems comprise the elements of an ozone gas generating apparatus, a water carrying tube including an ozone contact segment, and in some instances a bubble separating column or chamber. The ozone generating apparatus may comprise a cylindrical chamber through which atmospheric air containing diatomic oxygen is pumped or drawn. Radiation from a lamp capable of emitting intense ultraviolet light having a wavelength of approximately 185 nanometers and 254 nanometers excites the diatomic oxygen within the chamber. As a result of such molecular excitation, a fraction of the diatomic oxygen within the chamber is split, producing free atoms of oxygen. The extremely high chemical reactivity of free oxygen atoms within the chamber causes them to rapidly react with the remaining intact oxygen, forming ozone gas (O3).

Another commonly known method of producing ozone gas within a chamber is to install closely spaced electrodes therein and to, apply a sufficiently high electrical potential between the electrodes to produce electric discharge arcing. Diatomic oxygen molecules in close proximity with such electrical arcing similarly degrade into free oxygen atoms, which quickly react with diatomic oxygen to form ozone gas.

In commonly used configurations of ozone water purification systems utilizing ozone, ozone-rich air emitted from the ozone generator apparatus is introduced into a stream of water in need of purification, such water typically moving through a tube. Where air is forced through the ozone-generating apparatus by, for example, an air compressor, the output of the ozone generator may be introduced into the water-carrying tube by a simple air line interlinking ozone-rich air from the ozone generator to an aperture extending through the wall of the water-carrying tube. In other applications, the air line may terminate at a venturi installed in the water line so that water flowing through the venturi provides motive force to draw the ozone-rich air into the flow of water.

Ozone carrying air either injected into the contaminated water stream or drawn into the stream by a venturi initially exists in the form of air bubbles. In order for the ozone gas to have a purifying effect upon the water, such gas must be dissolved into the water. Such dissolving of the gas into the water necessarily occurs at the spherical surface tension boundaries between the gas and the water. A high solubility differential between common air components and ozone gas causes the ozone within such air bubbles to dissolve more quickly than other gases. An exception to this occurs where an ozone residual exists in water in close proximity to the bubbles. Here, rate of infusion of ozone into the water may be reduced due to the strong negative charge of the ozone molecules. In any case, ozone carrying bubbles must remain immersed in water a sufficient length of time to achieve sufficient diffusion of ozone into the water. In addition, it is well known that where the bubbles are kept small, i.e. prevented from merging into larger bubbles, rate of ozone diffusing into the water is increased. Initially, bubbles from a venturi orifice are small, but soon merge with other bubbles while travelling in the flow of water, which typically just after the venturi becomes laminar.

In some commonly configured ozone water purification systems, the water-carrying tube serves dual functions, both transporting water containing dissolved ozone to its desired destination, and providing an elongated contact distance where air bubbles containing ozone may remain in contact with the water for a sufficient length of time to allow dispersion of the ozone into the water. In order for ozone dispersion to occur within the water-carrying tube, the tube must have a sufficient length, i.e., an ozone contact length. The contact length of the tube may typically be between approximately 1–4 feet or so, and possibly up to 8 feet in length. However, the length may vary depending upon variables such as rate of flow within the tube, size of the tube, turbulence and water temperature. Sharp turns within the tube or turbulence-inducing baffles or screens installed within the bore of the water carrying tube may serve the function of breaking larger ozone-carrying bubbles into smaller bubbles, increasing the overall surface area of the bubbles, and increasing the rate the ozone dissolves into the water. In addition, and as stated, where an ozone residual exists in the water proximate the bubbles, such as where the flow becomes laminar, transfer of ozone from the bubbles is inhibited.

While venturi injectors or mixers such as those used in dissolving ozone into water provide a small bubble size, and as stated, the flow of water just downstream the injector, within 12–15 inches or so, becomes laminar. As such, the bubbles, being entrained in a laminar flow just downstream the injector, become so closely packed together that they merge into larger bubbles. Further, the fluid moving with the bubbles in the laminar flow becomes permeated with ozone, inhibiting further transfer of ozone from the bubbles.

Where water having dissolved ozone gas therein is poured into a body of water such as, for example, a swimming pool, the ozone beneficially reacts with various contaminants. For example, ozone rapidly reacts with metal ions within the water, forming precipitants which may be removed through filtration. Ozone dissolved in water also degenerates or causes lysis of the cell walls of bacteria, viruses, protozoan organisms algae and other microbiota. However, while ozone kills bacteria and viruses almost instantly, protozoa such as those that serve as hosts for bacteria that cause Legionnaires disease require longer exposure to higher concentrations of ozone in order to be killed. Ozone within water also beneficially oxidizes and neutralizes sulfides, nitrates, chloramines, cyanides, detergents, and pesticides. In all such cases, the efficacy of ozone in reacting with such contaminants is enhanced by reducing the physical distance between contaminant organisms or molecules and the molecules of ozone within the water. In a large volume of water, such as a drinking water storage tank, spa, or swimming pool, the concentration of dissolved ozone becomes undesirably low, slowing the rate at which the ozone reacts with contaminants. To prevent such dilution of ozone concentration, it is desirable to first introduce the ozone-carrying water into a reaction chamber having a smaller interior volume which maintains higher concentrations of ozone.

In addition to the foregoing, one problem with indoor pools, spas, hot tubs, jetted bathing facilities and other similar immersion facilities that utilize ozone for sanitization purposes is one of outgassing of the ozone into the area surrounding the facility. Here, strict rules have been enacted that require that outgassing of ozone from such a facility not exceed 0.1 ppm. Thus, it becomes necessary to ensure that little or no ozone is allowed to escape from the water. Further yet, where ozone is generated from air, only a fraction of the approximately 20% oxygen content of the air is converted to ozone. As a result, a relatively large quantity of atmospheric gasses are introduced into the water flow. In some systems, this is undesirable as the gasses produce cavitation of pumps, and where the flow is fast, can erode pipes and other parts of the water-carrying system. As a result, it is necessary in some systems to remove these atmospheric gasses in order to prevent deleterious effects on the system.

In all systems where ozone is used in conjunction with other sanitizers, such as bromine or chlorine, premixing of the sanitizer with ozone or air containing ozone is beneficial. Here, when ozone is premixed with halogens, such as sodium bromide, the bromine is released. With chloramines that are usually present, free chlorine is released. Where bicarbonate of soda is present, hydroxyl radicals are created, which acts as a sanitizer and increases the oxidation potential of the water. Ozone also increases the ground state of halogen sanitizers so that they are more reactive, increasing their sanitizing effects and potential to reduce contaminants.

In accordance with the foregoing, it is one object of the present invention to provide an ozone-based water purification system which incorporates in series an ozone generating apparatus and a mixer for mixing ozone-containing gas and a sanitizer prior to insertion of the mixed compounds into the water.

It is another object of the invention to provide such an ozone-based water purification system wherein turbulence and mixing of the flow of water and bubbles is induced well downstream of the venturi. This keeps bubble size small, and does not allow a buildup of ozone in water proximate the bubbles, allowing more ozone to dissipate into the water. In addition, this mixing and turbulence enhances killing of bacteria and viral organisms.

It is yet another object of the invention to provide a system wherein after the water is sanitized by exposure to at least ozone, any residual ozone remaining in the water is eliminated.

It is still another object of the invention to remove any atmospheric gasses from the flow of water after sterilization.

Other objects and benefits of the present invention will become known to those skilled in the art upon review of the detailed description which follows, and upon review of the appended drawings.

BRIEF DESCRIPTION OF THE DRAWINGS

FIG. 1a is a diagrammatic alternate view of the enclosure or housing shown in FIG. 1.

FIG. 2 is a sectional, partially exploded view taken along lines 2—2 of FIGS. 3 and 4.

FIG. 3 is an elevational view of an internal portion of an inlet venturi portion showing construction details thereof.

FIG. 4 is an elevational view of an internal portion of an outlet venturi portion showing construction details thereof.

FIG. 5 is an enlarged elevational view of a plug or stop for a check valve of the instant invention.

FIG. 6 is an enlarged side view of the plug or stop as shown in FIG. 5.

DETAILED DESCRIPTION OF THE PREFERRED EMBODIMENT

Figure 1:
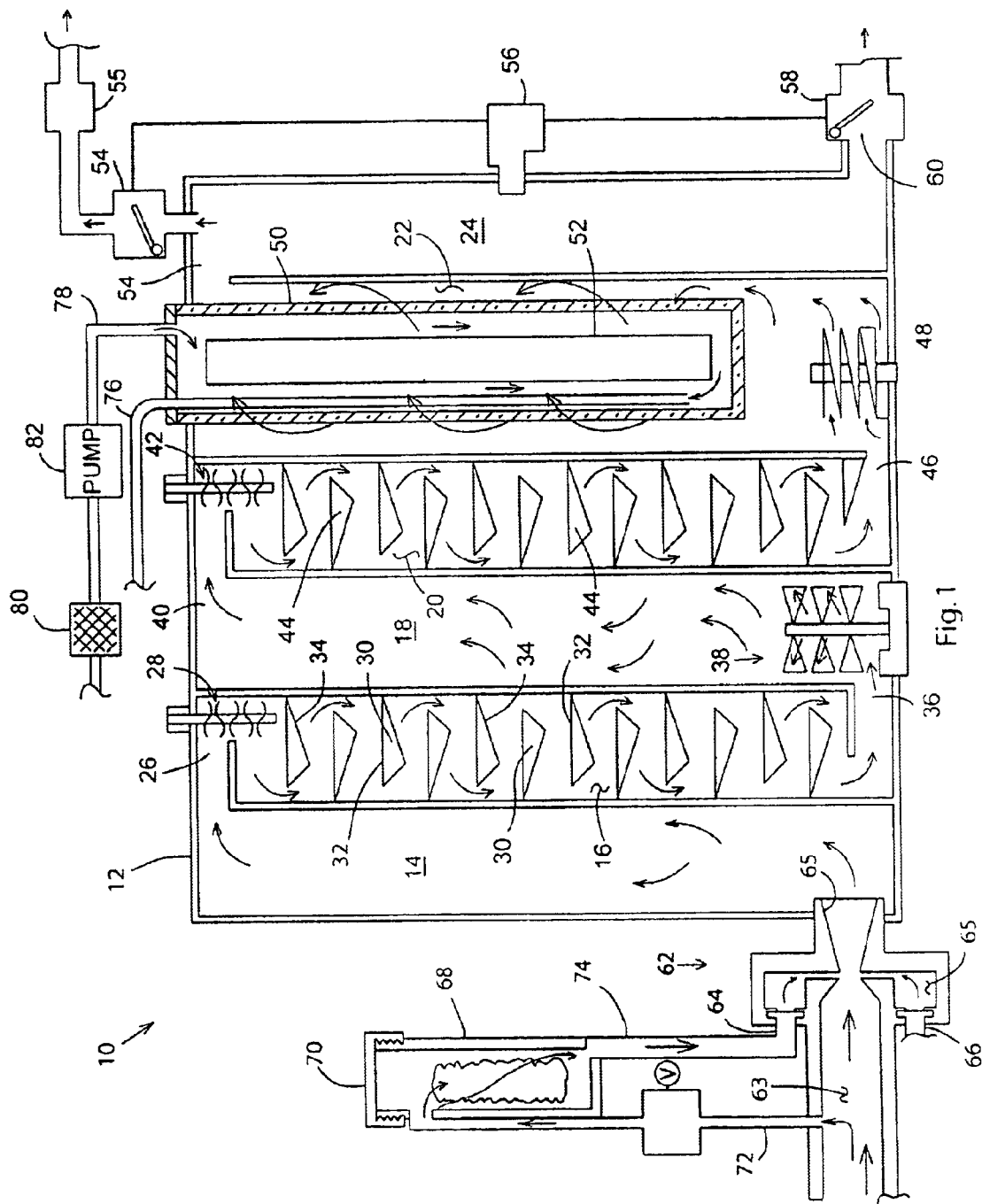
FIG. 1 is a diagrammatic view of the instant invention.

Referring now to the drawings, and in particular to FIG. 1, the instant inventive assembly for purifying water is referred to generally by reference arrow 10. The major components and compartments of assembly 10 may be, but not necessarily, be constructed integrally with or housed within a rigid casing 12, with access thereto provided by making one side, removable. Such a casing 12 may be rectangular or square, as seen from a side, and relatively narrow in width so as to be conveniently mountable within a spa or hot tub enclosure. In this application, a casing about 18 inches high has proved to function well. For other applications, the configuration as shown and described conveniently compartmentalizes the assembly 10 for use in conjunction with pool plumbing systems, spa plumbing systems, drinking water systems and other similar applications. Conveniently, the compartments may be formed by a linear extrusion process where the extrusion is cut to length and capped on each side. In this instance, the internal structures for directing water flow are inserted from ends of the compartments, and may be mounted to the end caps.

Referring further to FIG. 1, assembly 10 is shown having a number of compartments 14, 16, 18, 20, 22 and 24, each of these compartments communicating with adjacent compartments via openings at tops and bottoms thereof so that the flow of water, as indicated by arrows, traverses the full length of each compartment. As shown in FIG. 1a, those compartments wherein water is flowing upward may be larger in cross section or diameter, and compartments wherein water flows downward may be smaller in cross section or diameter. Here where the flow is upward, the flow is slower, allowing ozone in the bubbles a longer time to dissipate in the water. In those compartments where the flow is downward against the natural buoyancy of the bubbles, the compartments are smaller with a corresponding increased flow of water that entrains the bubbles in a faster, more turbulent flow. Initially, compartment 14 serves as a contact chamber wherein bubbles containing ozone are first exposed to the water. Where compartment 14 is larger, (FIG. 1a), the contact time is more prolonged. In addition, particular structures located in the compartments where the flow is downward or at entrances/exits thereof ensure that water flow is turbulent.

With respect to these structures, at an entrance 26 of compartment 16 is mounted a static mixer assembly 28, as shown and described in Applicant's patent application Ser. No. 09/752,982, filed Dec. 31, 2000, now U.S. Pat. No. 6,623,635, which is incorporated herein by reference in its entirety. Assembly 28 serves to generate turbulence in the flow of water for reasons earlier described. Within compartment 16, there are mounted a plurality of baffles 30 mounted at one edge 32 to the inner walls of the compartment, and have an opposite edge 34 angled or bent downward with respect to edge 30. With this construction, and as shown by arrows, the downward water flow through compartment 16 is forced to take a circuitous path around baffles 30. Baffles 30 also generate turbulence in the water. Where an extrusion is used to form the compartments, baffles 30 may be mounted to a strip or rod. Alternately, a freestanding structure, such as a plurality of spheres having openings cut therein, may be placed in compartments wherein turbulence and extended contact distance is desired.

At the bottom of compartment 16 is a combination water exit/entrance 36 where the water exits compartment 16 and flows into compartment 18. Just as the flow of water enters compartment 18 it encounters a water-directing assembly 38 that forces the water to flow upward with a circular, spiraling motion. As stated, compartment 18 may be larger in cross section or diameter, allowing a prolonged contact distance as earlier described for compartment 14.

At an upper end of compartment 18, a combined water outlet/inlet 40 passes the water from compartment 18 to compartment 20. As the water flows into compartment 20, from outlet/inlet 40, it encounters a static mixer assembly 42 as described for static mixer assembly 28. Once in compartment 20, a smaller compartment, the flow of water is again forced to follow a circuitous path around baffles 44 constructed as described for baffles 30, and which are mounted to sides of the compartment (or to an end cap) and extend inward to direct the flow of water in a turbulent manner.

At a bottom of compartment 20, a water exit/inlet 46 is provided to pass the flow of water from compartment 20 to compartment 22. Here, as the water flows into compartment 22, it encounters a second water-directing assembly 48 that directs the upward flow of water along a circular, spiral path. Alternately, the flow of water may be introduced into compartment 22 at an angle so as to induce a spiral motion to the water flowing through compartment 22.

Also positioned in compartment 22 is a watertight, sealed enclosure 50 within which an ultraviolet light-emitting lamp 52 is mounted or otherwise positioned. Lamp 52 is conventionally powered, as by a ballast connected to AC power and to the lamp. Watertight and airtight conductor connections through enclosure 50 would typically be employed. Enclosure 50 forms a portion of the ozone generator of the instant invention, as will be described hereinafter. Significantly, the walls of enclosure 50 are of a transparent, ultraviolet-transmitting material, such as, but not limited to, quartz, which passes the ultraviolet radiation to the water. In this compartment, water is forced to move in a spiral around enclosure 50 while being exposed to the ultraviolet light. This beneficially exposes any pathogens that may have survived to that point to lethal levels of ultraviolet radiation, and disassociates any residual ozone in the water into diatomic oxygen and free oxygen. Of course, the free oxygen so released is highly reactive, and reacts with practically any compound in the water almost instantaneously.

At a top of chamber 22 is a water outlet/inlet 54 that passes the flow of water to the last compartment 24. Structure herein is similar to that shown and described in Applicant's application Ser. No. 09/418,915, filed Oct. 15, 1999, now U.S. Pat. No. 6,342,154 and which is incorporated herein in its entirety by reference. Such structure removes entrapped air from the flow of water. Here, at a top of chamber 24 is a solenoid valve 54 that operates in conjunction with a water level sensor to 56 and, in some instances, a valve 58 is positioned at an outlet 60 of assembly 10. A small drain chamber 55 may be provided in the vent line after valve 54 and order to trap and drain small amounts of water expelled through valve 54. Operations of valves 54, 58 and sensor 56 may generally the such that when sensor 56 detects a lowered water level indicative of a gas buildup within compartment 24, a signal is sent to valve 54 to open this valve, thus venting the gas. In instances where the water system is pressurized, water pressure forcefully expels the gas through valve 54. In some of these pressurized systems, where the water pressure is sufficiently high to expel gas through valve 54, valve 58 may be omitted. In instances where the water pressure is somewhat lower, a small constriction may be provided at an exit 60 in order to cause the gas to be expelled through open valve 54. In other of these pressurized systems where valve 58 is installed, valve 58 may be closed when valve 54 is opened. In this instance, pressure in the system increases to more forcefully expel gas through valve 54. In any instance, after the water level rises (due to the gas is being expelled) to a preset point where the water level almost reaches valve 54, sensor 56 closes valve 54. In order to prevent gas buildup in compartments with low flow rates, such as compartment 14, a small vent line may be installed from the top of the compartment to a top of compartment 24. This line would be sized so as to readily vent gas, but not allow passage of a significant quantity of liquid to pass therethrough.

Still referring to FIG. 1, another feature of Applicant's invention may include premixing ozone gas with another sanitizing compound prior to insertion of the mixed compounds into the flow of water. Here, a venturi injector 62 similar to a venturi injector as shown and described in Applicant's application Ser. No. 09/393,437, now U.S. Pat. No. 6,192,911 and which is incorporated herein in its entirety by reference. This venturi 62 is conventionally provided with a water inlet 63 and a water outlet 65 through which a motive flow of water (as indicated by arrows) is pumped by a water pump (not shown). Venturi 62 is also provided with an annular cavity 65 (diagrammatically illustrated in FIG. 1) which in turn communicates with at least two sanitizer injection port 64 and 66. As shown, port 64 may be coupled to a canister 68 having a removable top 70 within which a solid, slowly dissolving form of sanitizer is placed an appropriate intervals. An inlet line 72 provides a flow of water from the motive flow to canister 68, where the sanitizer is dissolved into the water, and an outlet line 74 provides the water containing the dissolved sanitizer to inlet port 64. Inlet port 66 of the venturi is coupled to an outlet to 76 of enclosure 50 through which air is circulated around ultraviolet tube 52. To accomplish this, an inlet tube 78 is provided to enclosure 50. And air filter 80 may be coupled in line 78 to filter particulates from air circulated through enclosure 50. In some instances, an air pump 82 may be also placed in line 78 to pump air through enclosure 50. In any case, ozone-containing air from enclosure 50 is provided to port 66 of venturi 62, where the ozone-containing air is mixed with the sanitizer-containing water from canister 68 in annular chamber 65 of venturi 62. Alternately, any liquid sanitizer dispenser may be used, such as a liquid dispenser that dispenses a liquid containing a halogen or other sanitizer.

A multiport venturi 62 as contemplated by the present invention is more particularly described in FIGS. 2–6. Here, it is seen that venturi 62 is constructed in two portions or halves, an inlet portion 90 and an outlet portion 92. Nut/bolt pairs (not shown) extend through 8 pairs of aligned openings 93, 93a in each of portions 90, 92, and hold portions 90, 92 together while allowing disassembly thereof, as will be further explained. As shown, a flange 94 extends around a periphery of a body of inlet portion 90, flange 94 defining a cavity 96 therearound. As shown in FIGS. 2 and 3, small cavities 98, 98a generally receive sanitizing compounds from their respective inlets 64, 66, and channels 100, 100a carry the sanitizing compounds to an annular mixing cavity 102 where the sanitizing compounds are mixed. After being mixed, the sanitizing compounds are drawn by venturi action across a flat venturi interface 104, as will be further explained, and into the motive flow of water flowing through opening 106.

The outlet portion 92 is provided on an external side with inlets 64 and 66 for supplying sanitizers to the venturi. This may be the same sanitizer applied to each of inlets 64, 66 or dissimilar sanitizers may be applied to inlets 64, 66 as described above. In the latter instance, the dissimilar sanitizers are at least partially mixed prior to being introduced into the water flowing through the venturi. Of course, inlets 64, 66 may be located on the inlet portion 90 with appropriate modification, a should be apparent to one skilled of the art. Inlets 64, 66 each communicate with respective cavities 108, 108a, these cavities provided with stepped regions 110, 110a where these cavities are reduced to a smaller diameter. Within these smaller diameter areas the cavity is tapered as shown toward inlet bores 64a, 66a and the respective openings through which sanitizing compound flows. Within these smaller-in-diameter and tapered portions of cavities 108, 108a disks 112, 112a of a thin, flexible material are placed, these disks serving as check valves allow only a one way flow of sanitizer through inlets 64, 66. As these disks 112, 112a must move slightly within their cavities, the cavities are constructed slightly thicker and larger in diameter than the disks. For holding disks 112, 112a in place, plugs 114, 114a are provided, as particularly shown in FIGS. 5 and 6. These plugs are sized to snugly fit as shown into the larger portions of cavities 108, 108a and loosely hold disks 112, 112a in place. These plugs each are provided with a series of ridges 116 forming a plurality of grooves 118 in faces of the plug facing disks 112 (dashed lines and FIG. 5). As such, when sanitizer is flowing through the inlets 64, 66, the disks are moved away from the internal openings of the bores 64a and 66a and generally pressed against the grooves of plugs 114, 114a. As the disks are smaller than the radial extent of the grooves 118, sanitizer flows around the disks, into grooves 118 and through a central opening 120, 120a in the plugs. Openings 120, 120a in the plugs communicate via slots 100, 100a with annular mixing chamber 102, where the sanitizers are mixed and drawn into the venturi interface.

Additionally provided in outlet portion 92 is an annular cavity 122 surrounding opening 124 through which the motive flow of water flows from opening 106 of inlet portion 90. Together, annular cavities 102 and 122 form the cavity 65 diagrammatically shown in FIG. 1. A venturi interface 104a is located proximate venturi interface 104 of inlet portion 90, this dimension determined by thickness of a gasket 126 fitted between the inlet portion and outlet portion. Thus, the venturi may be adjusted for differing rates of flow by placing a gasket of appropriate thickness between the two portions. Here, where the flow rate is higher, a thicker gasket may be used, which in turn draws more sanitizing compounds into the venturi, and where the flow rate is lower, a thinner gasket may be used, which in turn draws less sanitizing compounds into the venturi. Of course, openings are cut in the gasket to allow flow of sanitizer therethrough and to allow motive flow of water through the gasket. Additionally, slots in the gasket may be cut along slots 100, 100a to allow the sanitizers to more fully be mixed in both annular chambers 102 and 122.

While a number of features are shown in assembly 10, it is to be understood that a system with fewer features may be implemented; as should be apparent to one skilled in the art. For example, a viable system would include contact compartment 14, a single turbulence compartment 16 and an ozone generation/reaction chamber 22. Further, in some systems, the gas removal compartment 24 may be omitted. In other systems, a conventional venturi may be used to inject ozone, with other sanitizers being conventionally dissolved in the water. Further, fewer turbulence-inducing assemblies may be employed. In venturi 62, multiple ports (more than 2) may be constructed therein, and the venturi itself may be scaled in size, in addition to adjusting the venturi gap depending on the flow

Having thus described my invention and the manner of its use, it should be apparent to one skilled in the art that incidental changes may be made thereto that fairly fall within the scope of the following appended claims, wherein I claim:

1. A water purification system comprising:
    an integral, compact enclosure containing a plurality of vertically oriented, serially coupled compartments configured to direct a flow of water alternately in upward and downward directions, with a first of said compartments having a water inlet and a last of said compartments having a water outlet, each said compartment extending the full vertical dimension of said enclosure;
    an ozone generator in one of said compartments comprising an ultraviolet lamp positioned in a watertight housing, with walls of said watertight housing transparent to ultraviolet radiation from said ultraviolet lamp, an air entrance in said watertight housing and an ozone/air outlet in said watertight housing;
    a supply of at least one substance that reacts beneficially with ozone; and
    a venturi coupled to said water inlet and comprising an annular chamber surrounding said flow of water, said annular chamber communicating with said flow of water via a flow passage, a plurality of spaced-apart inlet ports communicating with said annular chamber, a first of said inlet ports connected to said ozone/air outlet, a second of said inlet ports coupled to said supply of at least one substance, said venturi configured such that said ozone and said beneficial substance are mixed in said annular chamber prior to being introduced into said flow of water.

2. A water purification system as set forth in claim 1 wherein said flow passage is an annular flow passage surrounding said flow of water and wherein reaction products of said at least one substance and said ozone are introduced annularly to said flow of water.

3. A water purification system as set forth in claim 2 wherein said at least one substance is a liquid sanitizer.

4. A water purification system as set forth in claim 1 wherein one or more of said compartments contain turbulence-inducing devices.

5. A water purification system as set forth in claim 4 wherein some of said turbulence-inducing devices include alternately positioned baffles along walls of at least one of said compartments to force said flow of water to flow generally in back and forth relation through said at least one of said compartments.

6. A water purification system as set forth in claim 4 wherein some of said turbulence-inducing devices are configured to force said flow of water to flow generally spirally through at least one of said compartments.

7. A water purification system as set forth in claim 6 wherein said watertight housing is generally centrally located in a said compartment containing a one of said turbulence-inducing devices to cause water to spiral around said housing.

8. A water purification system as set forth in claim 1 wherein a last of said compartments contains de-gassing apparatus.

9. A water purification apparatus as set forth in claim 8 wherein said ozone generator is located in a one of said compartments immediately preceding said last of said compartments containing said de-gassing apparatus.

10. A water purification system as set forth in claim 1 wherein said compartments through which water is flowing downward are smaller in cross section and said compartments through which water is flowing upward are larger in cross section.

11. A water purification system as set forth in claim 1 wherein said enclosure and said vertically oriented compartments are about 18 inches in height.

12. A water purification system as set forth in claim 1 wherein said venturi is an adjustable venturi to vary a quantity of said ozone and said substance that reacts beneficially with ozone provided to said flow of water.

13. A water purification system comprising:

an integrally constructed, compact housing of relatively narrow width, said housing vertically divided into at least three compartments, with a water inlet in a first of said compartments and a water outlet in a last of said compartments, said compartments communicating with each other so that a flow of water through said compartments is serial and alternates in upward and downward directions;

an ultraviolet ozone generator having an air inlet and an ozone/air outlet mounted within one of said compartments, said ozone generator providing ultraviolet radiation to said flow of water;

a mixing device coupled to said water inlet and comprising a flow path therethrough for said flow of water;

an annular chamber in said mixing device and surrounding said flow path, said annular chamber communicating with said flow path via a flow passage;

a plurality of spaced-apart inlet ports communicating with said annular chamber;

a first of said inlet ports connected to said ozone/air outlet; and a second of said inlet ports coupled to a beneficial substance supply, said mixing device configured such that ozone produced in said generator and said beneficial substance are mixed in said annular chamber prior to being introduced into said flow of water.

14. A water purification system as set forth in claim 13 further comprising turbulence-inducing devices in at least one of said compartments.

15. A water purification system as set forth in claim 13 wherein said mixing device is adjustable to vary the mixed quantities of said ozone and said beneficial substance provided to said flow of water.

* * * * *